(12) United States Patent
Nyga et al.

(10) Patent No.: US 11,940,047 B2
(45) Date of Patent: Mar. 26, 2024

(54) CHAIN GUIDE ASSEMBLY FRAME

(71) Applicant: TSUBAKIMOTO CHAIN CO., Osaka (JP)

(72) Inventors: Volkmar Nyga, Osaka (JP); Seigo Ohsawa, Osaka (JP); Sung-Hwan Lim, Osaka (JP); Munehiro Maeda, Osaka (JP); Yuji Oshima, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/080,347

(22) Filed: Dec. 13, 2022

(65) Prior Publication Data

US 2023/0184311 A1 Jun. 15, 2023

(30) Foreign Application Priority Data

Dec. 15, 2021 (JP) ................................. 2021-203316

(51) Int. Cl.
*F16H 7/18* (2006.01)
*F02B 67/06* (2006.01)
(Continued)

(52) U.S. Cl.
CPC ............... *F16H 7/18* (2013.01); *F02B 67/06* (2013.01); *F16H 7/06* (2013.01); *F16H 7/08* (2013.01);
(Continued)

(58) Field of Classification Search
CPC ...... F16H 7/06; F16H 7/08; F16H 2007/0802; F16H 2007/0842; F16H 2007/0844;
(Continued)

(56) References Cited

U.S. PATENT DOCUMENTS 4,607,601 A * 8/1986 Kohler .................. F01L 1/02
123/90.31
4,869,708 A * 9/1989 Hoffmann ............. F01L 1/022
474/140
(Continued)

FOREIGN PATENT DOCUMENTS

DE 4025126 A1 * 2/1992 ............ F01L 1/024
DE 10105224 A1 * 8/2002 ............ F16H 7/18
(Continued)

OTHER PUBLICATIONS

Extended (Supplementary) Search Report dated May 2, 2023, issued in counterpart EP Application No. 22213309.2. (10 pages).

*Primary Examiner* — Michael R Mansen
*Assistant Examiner* — Raveen J Dias
(74) *Attorney, Agent, or Firm* — WHDA, LLP

(57) ABSTRACT

To provide a simple-structured chain guide assembly frame capable of reliably maintaining a correct positional relationship between a driven sprocket and a sprocket holding portion without the possibility of driven sprocket detachment. The chain guide assembly frame includes a main body having a fixed-guide-side sprocket holding portion and a pivoting-guide-side sprocket holding portion. The fixed-guide-side sprocket holding portion includes a first fixed-guide-side support portion that supports a driven sprocket at a first contact point, and a second fixed-guide-side support portion that supports the driven sprocket at a second contact point located more outside than the first contact point. When the driven sprocket is in an erected state in which the driven sprocket is supported at the first contact point and second contact point, the vector of gravity acting on the gravity center of the driven sprocket points between the first contact point and second contact point.

3 Claims, 4 Drawing Sheets

(51) Int. Cl.
*F16H 7/06* (2006.01)
*F16H 7/08* (2006.01)

(52) U.S. Cl.
CPC ............ *F16H 2007/0842* (2013.01); *F16H 2007/0872* (2013.01); *F16H 2007/0874* (2013.01); *F16H 2007/0893* (2013.01); *F16H 2007/185* (2013.01)

(58) Field of Classification Search
CPC ..... F16H 2007/0872; F16H 2007/0874; F16H 7/18; F16H 2007/185; F16H 2007/0893; F02B 67/04; F02B 67/06; F02B 67/00; F01L 1/02; F01L 1/022; F01L 1/024
See application file for complete search history.

(56) References Cited

U.S. PATENT DOCUMENTS

| | | | | |
|---|---|---|---|---|
| 6,955,622 | B2 * | 10/2005 | Bachmair | F01L 1/46 |
| | | | | 474/140 |
| 8,387,244 | B2 * | 3/2013 | Markley | F16H 7/08 |
| | | | | 123/90.31 |
| 2005/0130776 | A1 * | 6/2005 | Markley | F16H 7/24 |
| | | | | 474/140 |
| 2009/0205206 | A1 * | 8/2009 | Markley | F16H 7/08 |
| | | | | 474/140 |
| 2011/0015014 | A1 * | 1/2011 | Kroon | F16H 7/08 |
| | | | | 474/111 |
| 2022/0228649 | A1 * | 7/2022 | Nyga | F16H 7/06 |
| 2023/0193795 | A1 * | 6/2023 | Nyga | F01L 1/022 |
| | | | | 474/140 |

FOREIGN PATENT DOCUMENTS

| | | | |
|---|---|---|---|
| DE | 102018129532 B3 | 12/2019 | |
| DE | 102018117985 A1 | 1/2020 | |
| DE | 102018130732 A1 | 5/2020 | |
| DE | 102018130733 A1 * | 5/2020 | ............ F02B 67/06 |
| EP | 0297263 A1 * | 1/1989 | ............ F01L 1/02 |
| EP | 0823543 A1 * | 2/1998 | ............ F16H 7/18 |
| EP | 1321631 B1 * | 3/2005 | ............ F16H 7/18 |
| EP | 0848139 A1 * | 10/2019 | ............ F16H 7/18 |
| JP | 11-63128 A | 3/1999 | |
| WO | 2019/201391 A1 | 10/2019 | |
| WO | WO-2021122332 A1 * | 6/2021 | ......... B25B 27/0035 |

* cited by examiner

ENLARGED VIEW OF PART A

CHAIN GUIDE ASSEMBLY FRAME

BACKGROUND OF THE INVENTION

1. Field of the Invention

The present invention relates to a chain guide assembly frame used in a timing system of an engine or the like.

2. Description of the Related Art

The timing chain assembly described in Japanese Patent Application Publication No. H11-63128 is a conventionally known chain guide assembly used in a timing system of an engine or the like.

The frame of the chain guide assembly (timing chain assembly) described in Japanese Patent Application Publication No. H11-63128 includes a main body (chain damper 13), and a sprocket holding portion that holds driven sprockets (cam sprockets 10a and 10b) in an upper part of the main body (chain damper 13). A chain (timing chain 11) is passed around in a temporary assembled state in which the driven sprockets (cam sprockets 10a and 10b) and a drive sprocket (crank sprocket 12) are respectively set in the sprocket holding portion and a drive sprocket holding portion.

A fixed chain guide (guide portion 13a) that guides the tension side of the chain (timing chain 11) is provided on the tension side of the chain (timing chain 11) of the main body (chain damper 13). On the slack side of the chain (timing chain 11) is provided a pivoting chain guide (chain tensioner slipper 14) pivotable about a fixed pivot axis (pivot point) for guiding the chain (timing chain 11) and operable to provide a tension force.

The main body (chain damper 13) is pivotably supported on the pivot shaft (pivot point) of the pivoting chain guide (chain tensioner slipper 14). The main body (chain damper 13) includes support portions 13d that can support the driven sprockets (cam sprockets 10a and 10b) when the main body (chain damper 13) is rotated counterclockwise around the pivot shaft (pivot point), and a restricting portion 13b that can restrict rotation of the pivoting chain guide (chain tensioner slipper 14) to the slack side of the chain (timing chain 11).

A chain stopper guide 16 is pivotably supported on the pivot shaft (pivot point) of the pivoting chain guide (chain tensioner slipper 14). The chain stopper guide 16 includes a support portion 16c that can support the drive sprocket (crank sprocket 12) by rotating clockwise around the pivot shaft (pivot point), and a locking portion 16a.

This locking portion 16a of the chain stopper guide 16 is connected via a spring 17 to a locking portion 13c of the main body (chain damper 13), so that the chain stopper guide 16 is biased clockwise around the pivot shaft (pivot point), and the main body (chain damper 13) is biased counterclockwise around the pivot shaft (pivot point).

With this configuration, the driven sprockets (cam sprockets 10a and 10b) are pressed by the chain (timing chain 11) and held between the chain and the support portions 13d, and the drive sprocket (crank sprocket 12) is also pressed by the chain (timing chain 11) and held between the chain and the support portion 16c. Thus the drive sprocket (crank sprocket 12) and driven sprockets (cam sprockets 10a and 10b) are maintained in position in the temporary assembled state before assembly into an internal combustion engine.

SUMMARY OF THE INVENTION

The chain guide assembly frame described in Japanese Patent Application Publication No. H11-63128 still has some scope of improvement.

Namely, the chain guide assembly frame described in Japanese Patent Application Publication No. H11-63128 in which a chain stopper guide is provided separately from the main body, and the main body and the chain stopper guide are connected by a spring, there was the drawback of an increased number of components that lead to a cost increase.

In another known chain guide assembly frame, instead of using a chain stopper guide, a sprocket holding portion and a drive sprocket holding portion are provided to the main body, with the pivoting chain guide being connected to a pivoting chain guide holding portion disposed on the main body.

However, there was a concern that, in a state before the chain is biased by the pivoting chain guide, the driven sprocket could detach from the sprocket holding portion because of insufficient tension applied by the weight of the chain in the middle of the process of temporary assembling.

Even with the use of a tool that applies a force so that the chain is tensioned sufficiently during transportation before attachment to an engine or the like, there was a concern that the tool could disengage by vibration or the like, causing the sprocket to detach from the sprocket holding portion because of insufficient tension on the chain.

The present invention solves these problems and provides a simple-structured chain guide assembly frame capable of reliably maintaining a correct positional relationship between a driven sprocket and a sprocket holding portion without the possibility of driven sprocket detachment even when the chain is tensioned insufficiently or when the chain is suddenly freed from the tension.

The present invention solves the above problems by providing a chain guide assembly frame including a main body and a sprocket holding portion that supports a driven sprocket, the main body including a pivoting chain guide holding portion to which a pivoting chain guide is mountable, and a fixed chain guide. The sprocket holding portion includes a fixed-guide-side sprocket holding portion provided on a same side as the fixed chain guide, and a pivoting-guide-side sprocket holding portion provided on a same side as the pivoting chain guide holding portion. The fixed-guide-side sprocket holding portion includes at least a first fixed-guide-side support portion that supports the driven sprocket disposed in the fixed-guide-side sprocket holding portion from below at a first contact point, and a second fixed-guide-side support portion that supports the driven sprocket at a second contact point located more outside than the first contact point. When the driven sprocket is in an erected state in which the driven sprocket is supported simultaneously by the first fixed-guide-side support portion and the second fixed-guide-side support portion, the gravity acting on the driven sprocket has a vector pointing between the first contact point and the second contact point.

The chain guide assembly frame according to claim 1 includes a main body and a sprocket holding portion that supports a driven sprocket, the sprocket holding portion including a fixed-guide-side sprocket holding portion and a pivoting-guide-side sprocket holding portion. The fixed-guide-side sprocket holding portion includes a first fixed-guide-side support portion that supports the driven sprocket disposed in the fixed-guide-side sprocket holding portion from below at a first contact point, and a second fixed-guide-side support portion that supports the driven sprocket at a second contact point located more outside than the first contact point. When the driven sprocket is in an erected state in which the driven sprocket is supported simultaneously by the first fixed-guide-side support portion and the second fixed-guide-side support portion, the gravity acting on the driven sprocket has a vector pointing between the first contact point and the second contact point. The driven sprocket supported simultaneously by the first fixed-guide-side support portion and second fixed-guide-side support portion stays in the erected state and does not detach from the sprocket holding portion, and can keep the erected state where it is consistently supported at the first contact point and second contact point, even when the chain is not wound around yet.

According to the configuration set forth in claim 2, when the driven sprocket is supported simultaneously by the first fixed-guide-side support portion and the second fixed-guide-side support portion, a force of gravity of the driven sprocket acting on the center of gravity of the driven sprocket and a tension acting from the chain on the driven sprocket sum up to a net force with a vector pointing between the first contact point and the second contact point. Even when the driven sprocket is pressed by tension applied by the weight of the chain, the driven sprocket can stably stay in the sprocket holding portion in the erected state, and can keep the erected state where it is consistently supported at the first contact point and second contact point.

According to the configuration set forth in claim 3, the first fixed-guide-side support portion has a shape such that the closer to the second fixed-guide-side support portion, the more away from the center of gravity of the driven sprocket supported by the first fixed-guide-side support portion and the second fixed-guide-side support portion. In a case where the second fixed-guide-side support portion has a shape that is structurally hard to change, for example, the positions of the first contact point and second contact point relative to the center of gravity of the driven sprocket can easily be adjusted simply by changing the shape of the first fixed-guide-side support portion.

According to the configuration set forth in claim 4, the fixed-guide-side sprocket holding portion further includes a third fixed-guide-side support portion that is able to contact the driven sprocket from above. The third fixed-guide-side support portion is configured to be able to contact the driven sprocket when the driven sprocket separates from the second fixed-guide-side support portion and moves a predetermined amount inward of the fixed-guide-side sprocket holding portion. Thus the third fixed-guide-side support portion can limit the amount of movement of the driven sprocket even when the chain applies a high tension to the driven sprocket, and prevent the driven sprocket from excessively shifting out of the predetermined position.

DESCRIPTION OF THE PREFERRED EMBODIMENTS

A chain guide assembly frame 100 according to one embodiment of the present invention will be hereinafter described with reference to the drawings.

Figure 2:
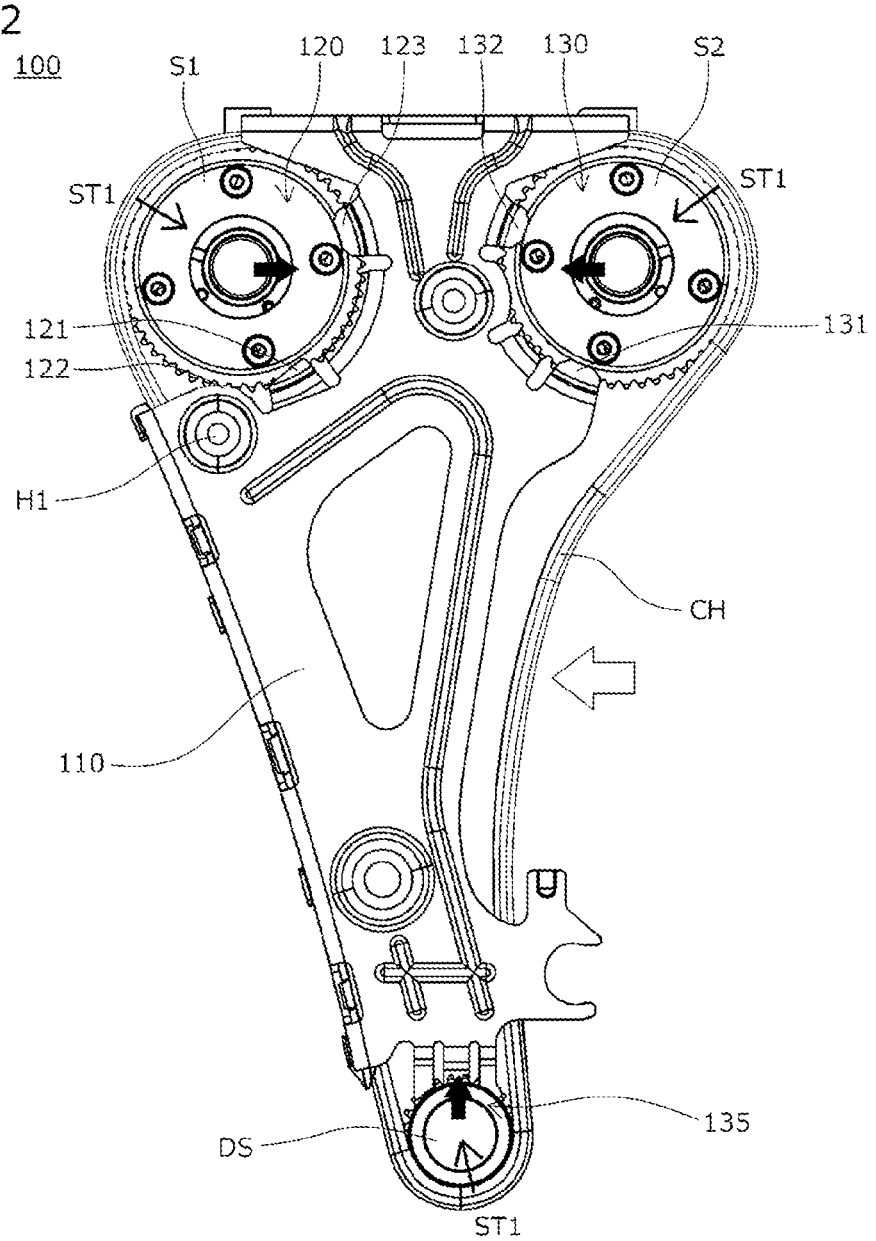
FIG. 2 is an overall view of the chain guide assembly frame 100 according to one embodiment of the present invention in a state in which the chain is fully tensioned.
Figure 3:
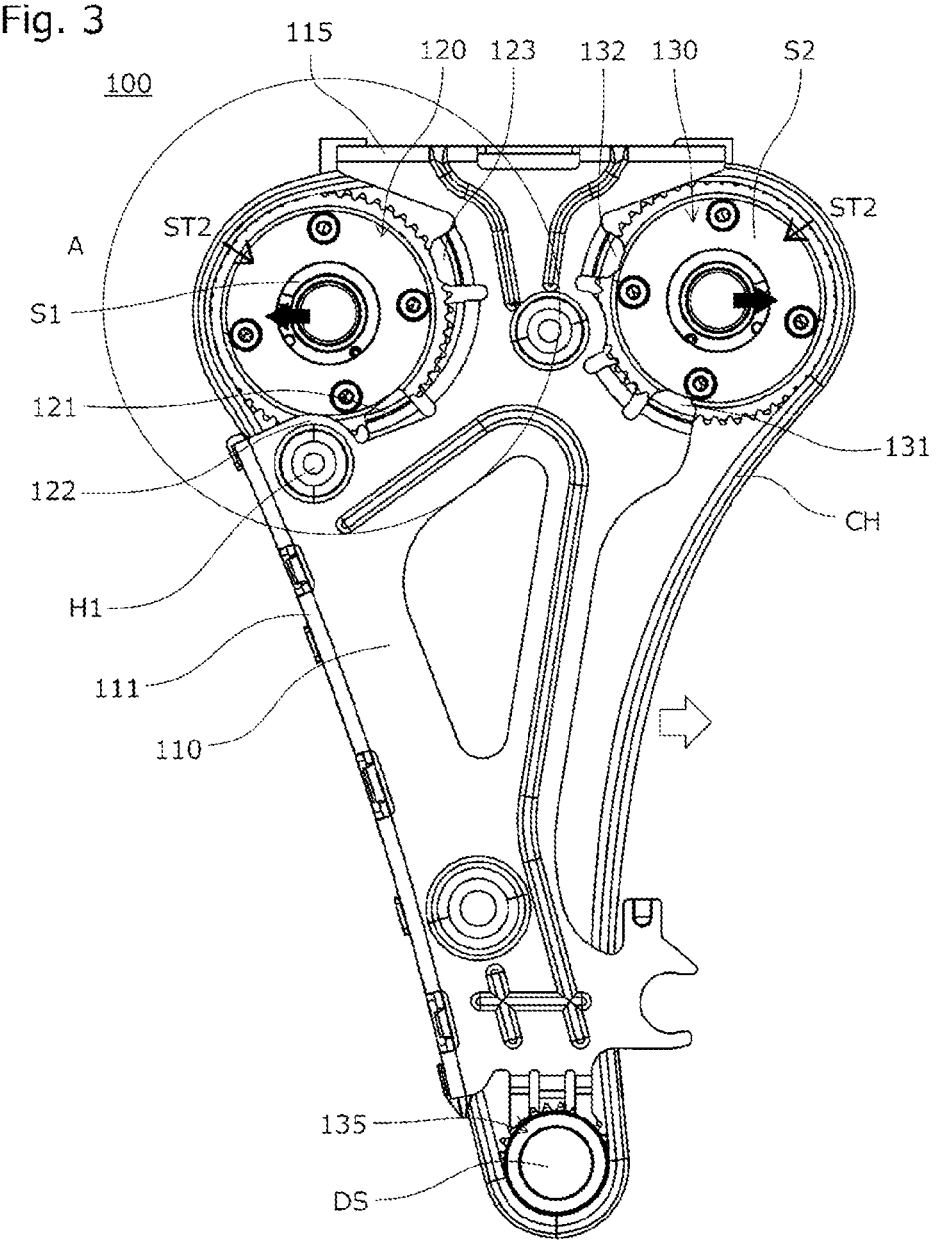
FIG. 3 is an overall view of the chain guide assembly frame 100 according to one embodiment of the present invention in a state in which the chain is not fully tensioned.

For ease of explanation, FIG. 2 and FIG. 3 do not illustrate the pivoting chain guide.

Figure 1:
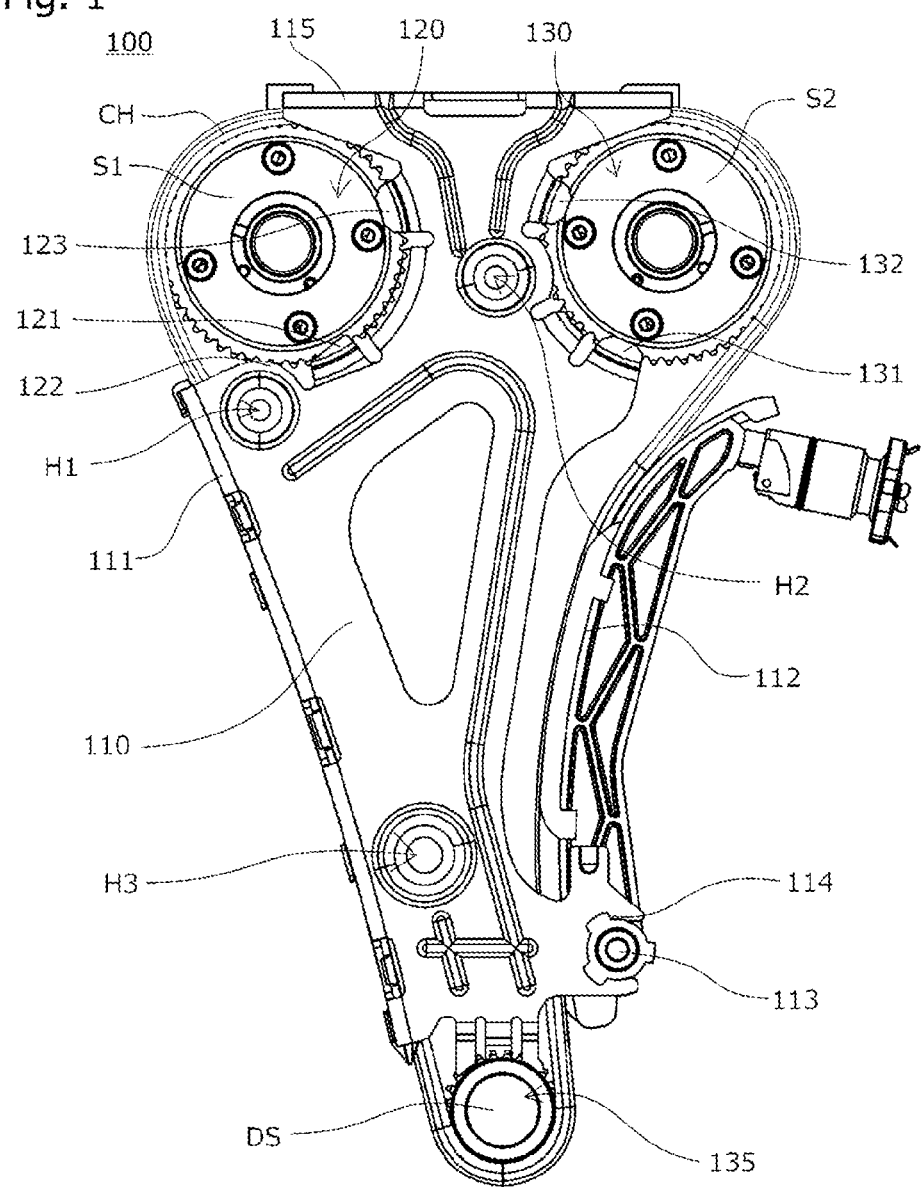
FIG. 1 is an overall view of a chain guide assembly frame 100 according to one embodiment of the present invention.

As shown in FIG. 1, the chain guide assembly frame 100 includes a main body 110, a top guide 115 provided on the upper surface of the main body 110, a fixed chain guide 111 provided on one side face of the main body 110, and a pivoting chain guide holding portion 114 to which a pivoting chain guide 112 can be attached on a side face of the main body 110 opposite from the fixed chain guide 111. A fixed-guide-side sprocket holding portion 120 is provided in an upper part of the main body 110 on the same side as the fixed chain guide 111, and a pivoting-guide-side sprocket holding portion 130 is provided in an upper part of the main body 110 on the same side as the pivoting chain guide holding portion 114. A drive sprocket holding portion 135 that can hold a drive sprocket DS is provided in a lower part of the main body 110.

Mounting holes H1, H2, H3 used when fixing the frame to an engine are provided in various parts of the main body 110.

The pivoting chain guide 112 is pivotably attached to the pivoting chain guide holding portion 114 via a pivot shaft 113, and configured to be able to press the chain CH passed around the assembly.

The fixed-guide-side sprocket holding portion 120 is configured to be able to hold a fixed-guide-side driven sprocket S1, and provided with a first fixed-guide-side support portion 121, a second fixed-guide-side support portion 122, and a third fixed-guide-side support portion 123, which are capable of supporting the fixed-guide-side driven sprocket S1 or holding the sprocket between themselves and the chain CH at a specific position.

The second fixed-guide-side support portion 122 is disposed above the mounting hole H1, the first fixed-guide-side support portion 121 is located more inside than the second fixed-guide-side support portion 122, and the third fixed-guide-side support portion 123 is disposed further inside than the first fixed-guide-side support portion 121.

The pivoting-guide-side sprocket holding portion 130 is configured to be able to hold a pivoting-guide-side driven sprocket S2, and provided with a first pivoting-guide-side support portion 131 and a second pivoting-guide-side support portion 132, which are capable of supporting the pivoting-guide-side driven sprocket S2 or holding the sprocket between themselves and the chain CH at a specific position.

The first pivoting-guide-side support portion 131 is located more outside than the second pivoting-guide-side support portion 132.

The chain CH is passed around to surround the drive sprocket DS, fixed-guide-side driven sprocket S1, and pivoting-guide-side driven sprocket S2, and is passed over each of the top guide 115, fixed chain guide 111, and pivoting chain guide 112.

Next, how the fixed-guide-side driven sprocket S1 is held by the fixed-guide-side sprocket holding portion 120 of the chain guide assembly frame 100 according to one embodiment of the present invention will be described with reference to FIG. 2 to FIG. 4.

When the pivoting chain guide 112 applies a pressing force on the chain CH, i.e., presses the chain CH toward the main body 110, the chain CH becomes tensioned by the amount of the pressing force, so that the chain CH presses the drive sprocket DS, fixed-guide-side driven sprocket S1, and pivoting-guide-side driven sprocket S2 inward of the drive sprocket holding portion 135, fixed-guide-side sprocket holding portion 120, and pivoting-guide-side sprocket holding portion 130, respectively, by tension ST.

At this time, the fixed-guide-side driven sprocket S1 moves slightly inward of the fixed-guide-side sprocket holding portion 120, and comes to a position where it is held between the chain CH and the third fixed-guide-side support portion 123 as shown in FIG. 2, or to a position where it is held by the chain CH, first fixed-guide-side support portion 121, and third fixed-guide-side support portion 123.

Therefore, the fixed-guide-side driven sprocket S1 can be held stably and is unlikely to detach from the fixed-guide-side sprocket holding portion 120.

It is possible to adjust the amount of movement of the fixed-guide-side driven sprocket S1 when it is held between the third fixed-guide-side support portion 123 and the chain CH by changing the protruding amount of the third fixed-guide-side support portion 123, so as to minimize misalignment of the fixed-guide-side driven sprocket S1 when the chain guide assembly is attached to the engine.

The pivoting-guide-side driven sprocket S2 also moves slightly inward of the pivoting-guide-side sprocket holding portion 130, and comes to a position where it is held between the chain CH and the second pivoting-guide-side support portion 132 as shown in FIG. 2, or to a position where it is held by the chain CH, first pivoting-guide-side support portion 131, and second pivoting-guide-side support portion 132. The drive sprocket DS is also pressed inward of the drive sprocket holding portion 135 and held between the chain CH and the drive sprocket holding portion 135.

Next, the movements of the fixed-guide-side driven sprocket S1 when the pressing force applied to the chain CH by the pivoting chain guide 112 is insufficient are described with reference to FIG. 3 and FIG. 4.

When the pressing force applied to the chain CH by the pivoting chain guide 112 is insufficient, the chain CH becomes slack to some extent in parts along the top guide 115 and fixed chain guide 111.

In the case where the pivoting chain guide 112 is not completely separated from the chain CH, the chain CH becomes slack also in the part along the pivoting chain guide 112.

At this time, as shown in FIG. 3, the tension applied from the chain CH to the fixed-guide-side driven sprocket S1, pivoting-guide-side driven sprocket S2, and drive sprocket DS is reduced, so that the fixed-guide-side driven sprocket S1 receives, from the chain CH, tension ST2 that is lower than tension ST1.

Figure 4:
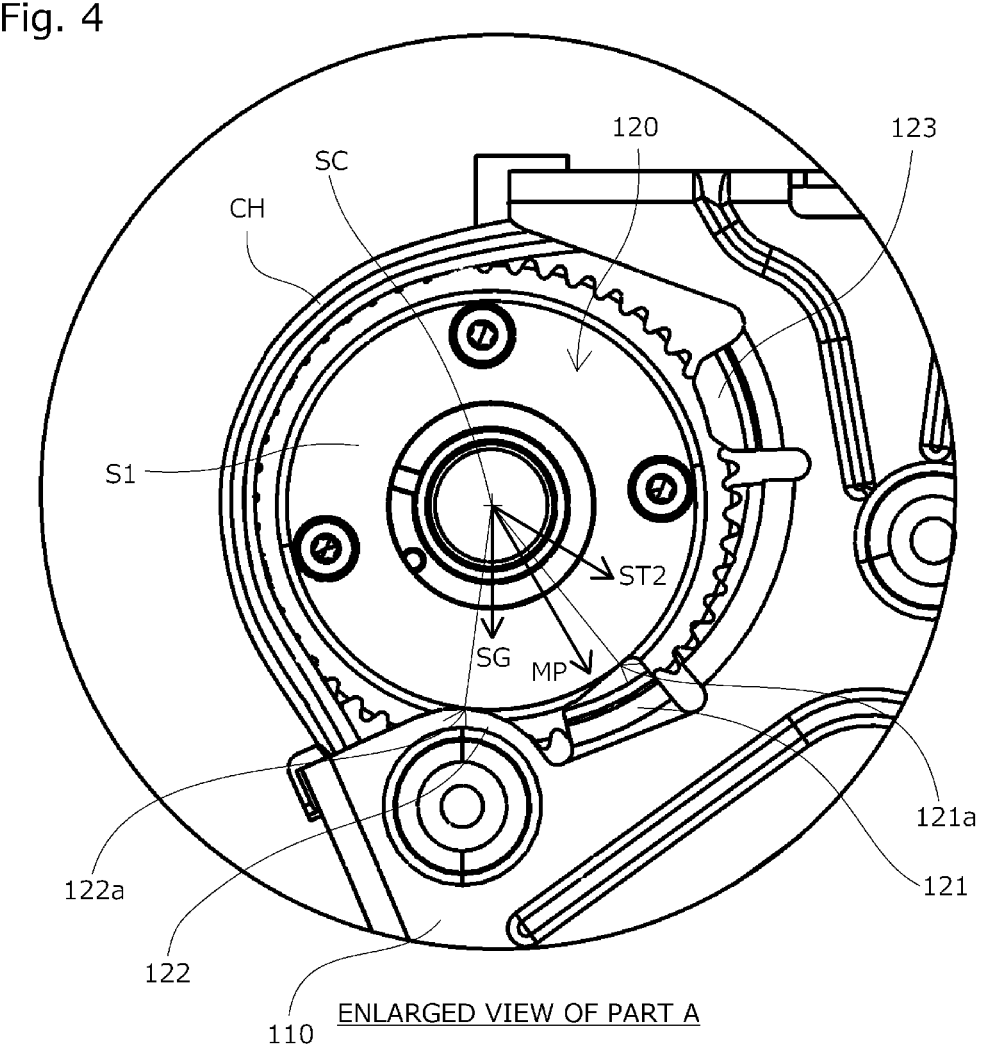
FIG. 4 is an enlarged view of part A of the chain guide assembly frame 100 according to one embodiment of the present invention in a state in which the chain is not fully tensioned.

When tension ST2 fails to provide a sufficient force for holding the fixed-guide-side driven sprocket S1 between the chain CH and the third fixed-guide-side support portion 123, the fixed-guide-side driven sprocket S1 separates from the third fixed-guide-side support portion 123 and moves outward of the fixed-guide-side sprocket holding portion 120, and comes to contact with the first fixed-guide-side support portion 121 at a first contact point 121a and with the second fixed-guide-side support portion 122 at a second contact point 122a as shown in FIG. 4.

Unless the fixed-guide-side driven sprocket S1 undergoes a change in its shape, the fixed-guide-side driven sprocket S1 comes to contact simultaneously with the first fixed-guide-side support portion 121 and second fixed-guide-side support portion 122 at the first contact point 121a and second contact point 122a, which are each a fixed point.

The fixed-guide-side driven sprocket S1 here is subjected to the force of gravity SG and tension ST2 of the chain CH, which can each be represented by force vectors from the center of gravity SC of the fixed-guide-side driven sprocket S1.

If the fixed-guide-side driven sprocket S1 at this time is supported by the first fixed-guide-side support portion 121 and second fixed-guide-side support portion 122 such that the net force MP of gravity SG and tension ST2 of the chain CH is directed toward a point between the first contact point 121a and the second contact point 122a as shown in FIG. 4, the fixed-guide-side driven sprocket S1 is unlikely to detach from the fixed-guide-side sprocket holding portion 120. Namely, the temporarily assembled state of the chain guide assembly can be maintained, in which the fixed-guide-side driven sprocket is supported by the first fixed-guide-side support portion 121 and second fixed-guide-side support portion, so that the assembly can readily be attached to the engine without a large misalignment of the fixed-guide-side driven sprocket.

The positions of the first contact point 121a and second contact point 122a can be changed as required by making changes to the shapes of the first fixed-guide-side support portion 121 and second fixed-guide-side support portion 122. In the case where the second fixed-guide-side support portion 122 is formed near the mounting hole H1, for example, to make the positions of the first contact point 121a and second contact point 122a adjustable, only the first fixed-guide-side support portion 121 may be designed in a specific shape such that the closer to the second fixed-guide-side support portion 122, the more away from the center of gravity of the fixed-guide-side driven sprocket S1 supported by the first fixed-guide-side support portion 121 and second fixed-guide-side support portion 122.

In the case particularly where the chain guide assembly frame 100 has a predetermined standard design, cutting the first fixed-guide-side sprocket holding portion 121 into the above-described shape is all that is necessary to prevent accidental detachment of the fixed-guide-side driven sprocket S1 from the fixed-guide-side sprocket holding portion 120 in various different product specifications. Thus the operation of mounting the chain guide assembly to the engine can be carried out in an efficient manner.

Even when the chain CH is not passed over the sprockets yet, the fixed-guide-side driven sprocket S1 in an erected state does not detach from the fixed-guide-side sprocket holding portion 120, as long as the vector of the gravity that acts on the fixed-guide-side driven sprocket S1 is pointing between the first contact point 121a and the second contact point 122a.

The pivoting-guide-side driven sprocket S2 also moves slightly outward of the pivoting-guide-side sprocket holding portion 130 when the chain CH becomes slack. However, the pivoting-guide-side driven sprocket S2 is supported not only by the first pivoting-guide-side support portion 131 but also by the chain CH from below in the part along the pivoting chain guide 112. Therefore, the pivoting-guide-side driven sprocket S2 is unlikely to detach from the pivoting-guide-side sprocket holding portion 130 in an erected state.

While one embodiment of the present invention has been described in detail, the present invention is not limited to the embodiment described above and may be carried out with various design changes without departing from the scope of the present invention set forth in the claims.

While the embodiment described above mentions processing of the first fixed-guide-side support portion only to make the positions of the first contact point and second contact point adjustable, the way the positions of the first contact point and second contact point are adjusted is not limited to this example. The positions of the first contact point and second contact point may be adjusted by processing the second fixed-guide-side support portion alone, for example. Alternatively, a third contact point that supports the fixed-guide-side driven sprocket at the same time with the first contact point and second contact point may be provided.

In the embodiment described above, the fixed-guide-side sprocket holding portion includes a third fixed-guide-side support portion and is configured to hold the fixed-guide-side driven sprocket between the chain and the third fixed-guide-side support portion. The configuration of the fixed-guide-side sprocket holding portion is not limited to this example. The third fixed-guide-side support portion may not be provided, for example, i.e., the fixed-guide-side driven sprocket may be held between the chain and the first fixed-guide-side support portion.

In the embodiment described above, a mounting hole is provided near the second fixed-guide-side support portion. The number and position of mounting holes are not limited to this example. A mounting hole may be provided, for example, near the first pivoting-guide-side support portion.

The above-described embodiment in which a top guide is provided on the upper surface of the main body and a fixed chain guide is provided on a side face of the main body is not intended to limit the configuration of the chain guide assembly frame to this example. The top guide may be omitted, for example, or the fixed chain guide may be omitted.

What is claimed is:

1. A chain guide assembly frame comprising a main body and a sprocket holding portion that is able to support a driven sprocket,
    the main body including a pivoting chain guide holding portion that is able to mount a pivoting chain guide, and a fixed chain guide,
    the sprocket holding portion including a fixed-guide-side sprocket holding portion provided on a same side as the fixed chain guide, and a pivoting-guide-side sprocket holding portion provided on a same side as the pivoting chain guide holding portion,
    the fixed-guide-side sprocket holding portion including at least a first fixed-guide-side support portion that supports the driven sprocket disposed in the fixed-guide-side sprocket holding portion from below at a first contact point, and a second fixed-guide-side support portion that supports the driven sprocket at a second contact point located more outside than the first contact point,
    a force of gravity acting on the driven sprocket having a vector that points between the first contact point and the second contact point when the driven sprocket is in an erected state in which the driven sprocket is supported simultaneously by the first fixed-guide-side support portion and the second fixed-guide-side support portion,
    the first fixed-guide-side support portion has a shape such that the closer to the second fixed-guide-side support portion, the more away from a center of gravity of the driven sprocket supported by the first fixed-guide-side support portion and the second fixed-guide-side support portion.

2. The chain guide assembly frame according to claim 1, wherein, when the driven sprocket is supported simultaneously by the first fixed-guide-side support portion and the second fixed-guide-side support portion, tension acting from a chain on the driven sprocket when the chain of a chain guide assembly is wound around the main body and the force of gravity of the driven sprocket acting on the center of gravity of the driven sprocket sum up to a net force with a vector pointing between the first contact point and the second contact point.

3. The chain guide assembly frame according to claim 1, wherein the fixed-guide-side sprocket holding portion further includes a third fixed-guide-side support portion that is able to contact the driven sprocket from above,
    the third fixed-guide-side support portion being configured to be able to contact the driven sprocket when the driven sprocket separates from the second fixed-guide-side support portion and moves a predetermined amount inward of the fixed-guide-side sprocket holding portion.

* * * * *